United States Patent [19]

Leblanc

[11] Patent Number: 4,970,755
[45] Date of Patent: Nov. 20, 1990

[54] APPARATUS FOR TRIMMING BACK FAT OFF A PORK SHOULDER BUTT

[75] Inventor: Georges E. Leblanc, St-Anselme, Canada

[73] Assignee: G.E. Leblanc Inc., Quebec, Canada

[21] Appl. No.: 454,913

[22] Filed: Dec. 22, 1989

[30] Foreign Application Priority Data

Aug. 30, 1989 [CA] Canada .................................. 609803

[51] Int. Cl.$^5$ ......................... A22B 5/16; A22C 17/12
[52] U.S. Cl. .................................. 452/134; 452/149; 452/177
[58] Field of Search .................... 17/1 R, 1 G, 52, 46, 17/21, 50; 30/123.3, 272 A, 276, 309, 312, 356; 83/662

[56] References Cited

U.S. PATENT DOCUMENTS

| | | | |
|---|---|---|---|
| 3,197,808 | 8/1965 | Mears | 17/1 G |
| 3,352,011 | 11/1967 | Alexander et al. | 17/1 G |
| 3,546,737 | 12/1970 | Neebel et al. | 17/1 |
| 3,685,095 | 8/1972 | Metro | 17/1 |
| 3,771,196 | 11/1973 | Doerfer et al. | 17/1 R |
| 4,009,652 | 3/1977 | Anderson | 99/590 |
| 4,189,806 | 2/1980 | Van Heyningen | 17/52 |
| 4,557,014 | 12/1985 | Vogt | 17/1 R |

Primary Examiner—Willis Little
Attorney, Agent, or Firm—Michael L. Keller; James R. Longacre

[57] ABSTRACT

The apparatus for trimming a layer of back fat off a pork shoulder butt comprises a frame as well as a flat, flexible and arcuate cutting blade with two ends respectively attached to a pair of blade holders pivotally mounted onto the frame. A conveyor, a set of upper gripper belts, and a rotative roller pass the shoulder butt through the blade to trim off the layer of fat. The rotative roller has a diameter gradually decreasing along its longitudinal axis from each end of the roller toward the center thereof to define an annular, concave outer surface. This roller is mounted onto the frame adjacent the arcuate blade on the outside of the curve this blade defines but with a distance separating the annular surface and the blade to enable passage of the layer of fat between them. The annular outer surface of the roller is formed with teeth to engage the fat whereby rotation of the roller forces the shoulder butt through the blade. The two blade holders are pivoted to adjust the arcuation in the blade and the distance separating the annular concave surface and this blade to an inner profile and a thickness of the layer of fat whereby trimming of the latter layer is optimized.

20 Claims, 4 Drawing Sheets

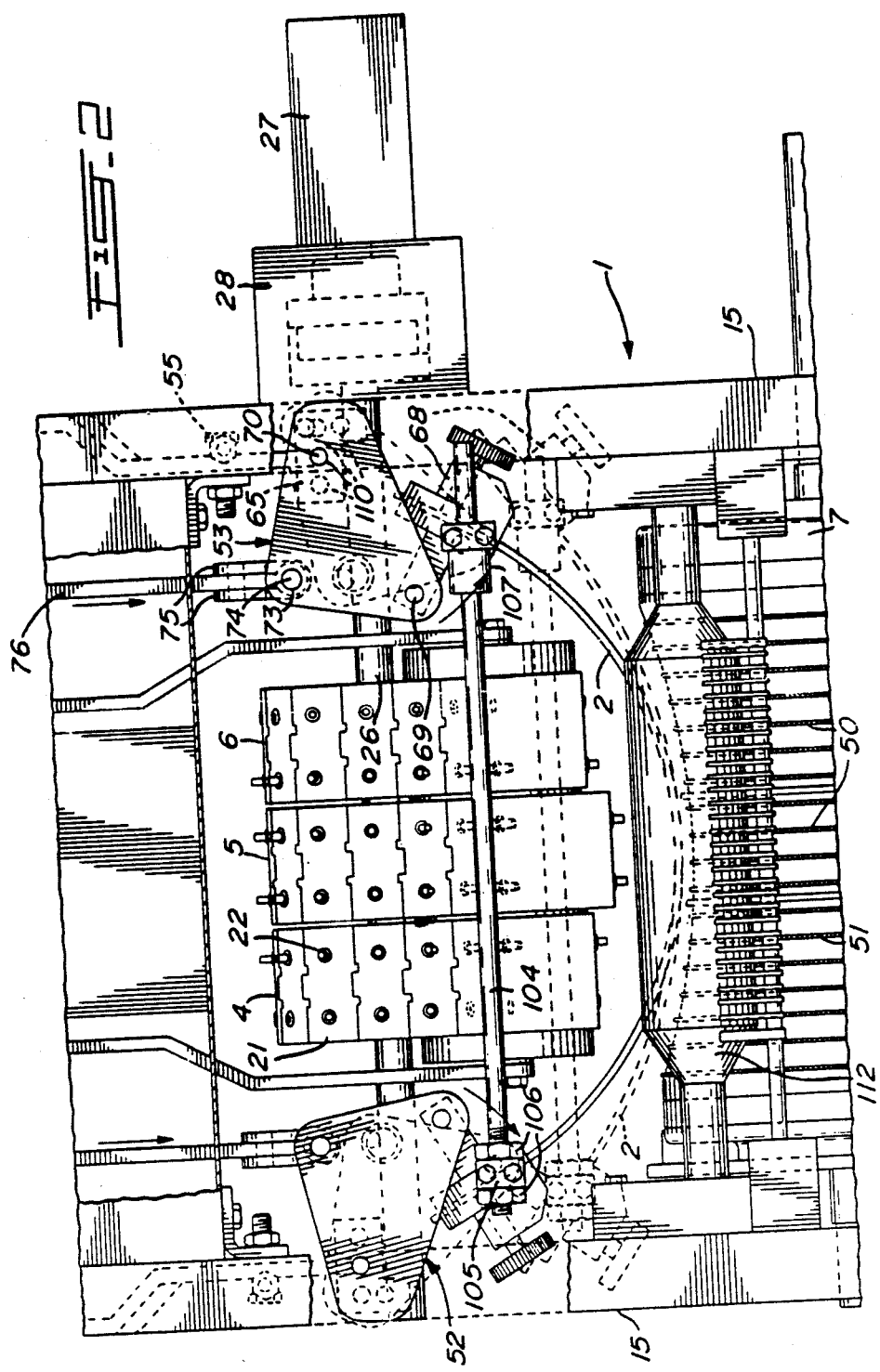

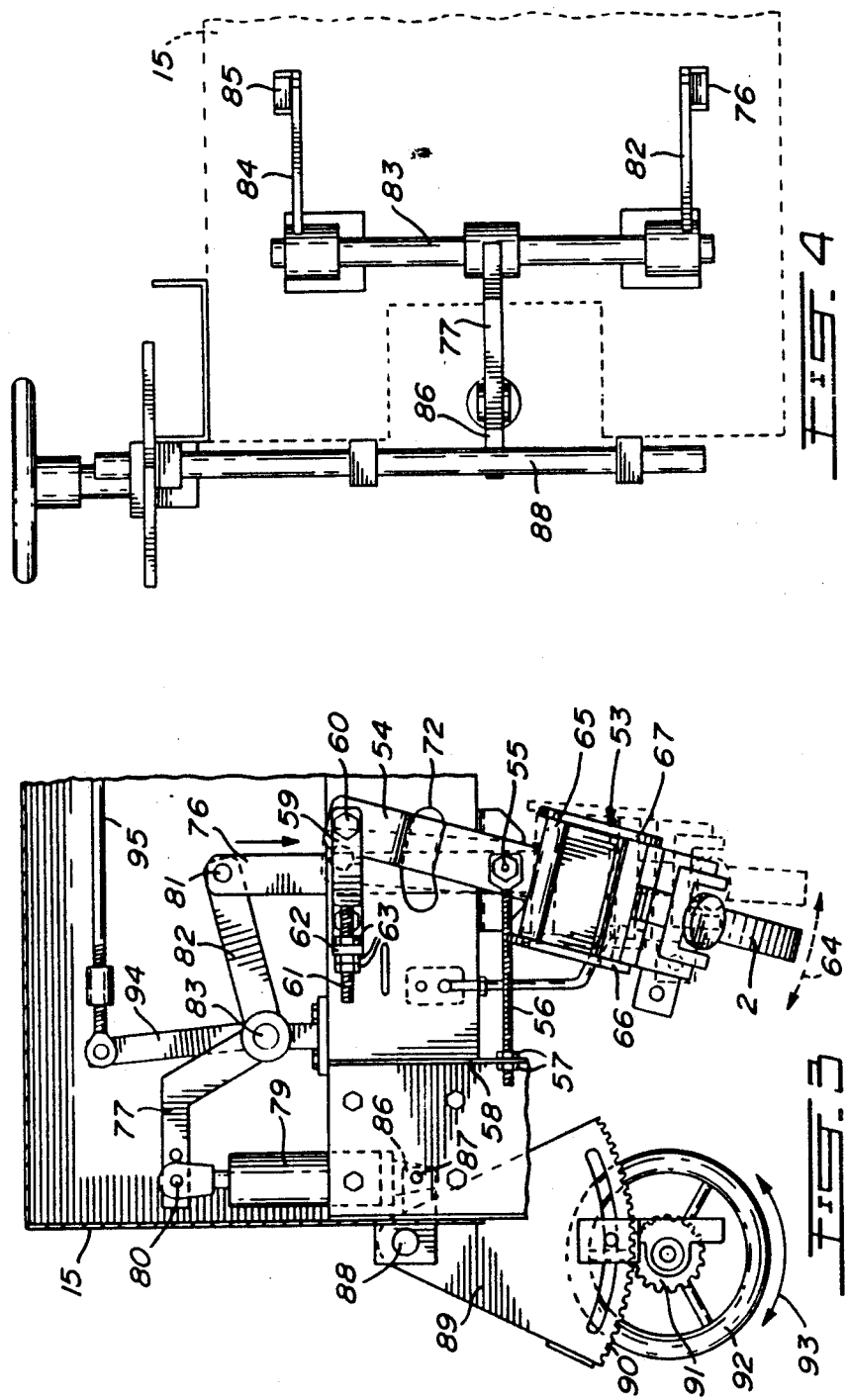

APPARATUS FOR TRIMMING BACK FAT OFF A PORK SHOULDER BUTT

BACKGROUND OF THE INVENTION

1. Field of the Invention

The present invention is concerned with an apparatus for trimming a layer of fat off a piece of meat, in particular but not exclusively a layer of back fat off a pork shoulder butt, for example of the Boston style.

2. Brief Description of the Prior Art

An apparatus of the above type is described in U.S. Pat. No. 3,546,737 (NEEBEL ET AL.) issued on Dec. 15, 1970. This prior art apparatus comprises a conveyor for receiving an animal side, more particularly a pork side, and for conveying it through a knife in the form of a U-shaped, flat flexible cutting blade. The pork side is positioned onto the conveyor with the backbone up and the thicker end thereof is forced against a side rail; the pork side is held in this position during transport thereof onto the conveyor. A first end of the flexible blade is pivotally mounted onto a mechanical linkage itself pivotally attached to the frame of the apparatus, while the second end of this blade is fixedly secured to an mechanical assembly rotatable about a vertical shaft. As the pork side is conveyed, the first end of the blade is moved laterally and vertically through pivoting of the mechanical linkage while the second end thereof is twisted and moved backward through rotation of the mechanical assembly to thereby enable the knife to follow the inner profile of the layer of back fat on the pork side whereby trimming of this fat layer is optimized.

A drawback of the apparatus of U.S. Pat. No. 3,546,737 is the complexity of its structure and operation due to the contemplated application, namely to trim the back fat off an entire pork side; one end of the blade is moved laterally and vertically while the other end thereof is twisted and displaced backward to follow the inner profile of the layer of fat. In addition, a side rail and other elements associated therewith are required to position the pork side as it is conveyed through the blade. Obviously, the conveyor of NEEBEL et al. also lacks efficiency in forcing the pork side through the knife blade.

OBJECTS OF THE INVENTION

An object of the present invention is therefore to eliminate the above discussed drawbacks of the prior art.

Another object of the invention is to provide an apparatus for trimming an outer layer of fat off a piece of meat in which the arcuation in the flexible cutting blade is modified by means of a simple mechanism.

A further object of the subject invention is to provide a fat trimming apparatus structured to force efficiently the piece of meat though the arcuate blade.

A still further object of the invention is to provide an apparatus particularly well adapted to trim a layer of back fat off a pork shoulder butt, for example of the Boston style.

SUMMARY OF THE INVENTION

More specifically, in accordance with the invention, there is provided an apparatus for trimming an outer layer of fat off a piece of meat, comprising:

a frame;

a flat, flexible and arcuate cutting blade with two ends;

first and second blade holders pivotally mounted onto the frame, the first and second holders comprising means for securing thereto the two ends of the blade, respectively;

means for passing the piece of meat through the blade to trim off the layer of fat; the passing means comprises a rotative roller with two opposite ends, with a center, with a longitudinal axis about which it rotates, and with a diameter gradually decreasing along its longitudinal axis from each end of the roller toward the center thereof to define an annular, concave outer surface, the rotative roller is mounted onto the frame adjacent the arcuate blade on the outside of the curve this blade defines but with a distance separating the annular surface and the blade to enable passage of the layer of fat between them, and the annular outer surface of the roller comprises means for engaging the fat whereby rotation of the roller forces the piece of meat through the blade.

The trimming apparatus further includes means for pivoting the first and second blade holders to adjust (a) the arcuation in the blade and (b) the distance separating the annular concave surface and the blade to an inner profile and a thickness of the layer of fat whereby trimming of this fat layer is optimized.

Thanks to the relatively small diameter of the rotative roller and to its position adjacent the arcuate blade, it engages more easily the fat and forces more efficiently the piece of meat through the blade. The operation of the trimming apparatus is thereby improved.

Preferably, the first and second blade holders are each mounted onto the frame through a first pivot, the corresponding end of the blade is attached to the holder through a second pivot spaced apart from the first one. Also the arcuate blade is lying into a plane, and the first and second pivots are generally perpendicular to this plane.

The objects, advantages and other features of the present invention will become more apparent upon reading of the following non-restrictive description of a preferred embodiment thereof, given as a non-limitative example only with reference to the accompanying drawings.

BRIEF DESCRIPTION OF THE DRAWINGS

In the appended drawings:

FIG. 2 is a rear, elevation view of the trimming apparatus of FIG. 1;

FIGS. 3 and 4 are respectively side elevation and plan views of a mechanism of the apparatus of FIG. 1 for pivoting the blade holders and thereby modifying the arcuation in the flat, flexible blade.

DETAILED DESCRIPTION OF THE PREFERRED EMBODIMENT

In the following description, reference will be made specifically to an apparatus for trimming a layer of back fat off a pork shoulder butt. However, one skilled in the art will appreciate that the apparatus of the invention can be used to cut an outer layer of fat from another type of piece of meat.

Figure 1:
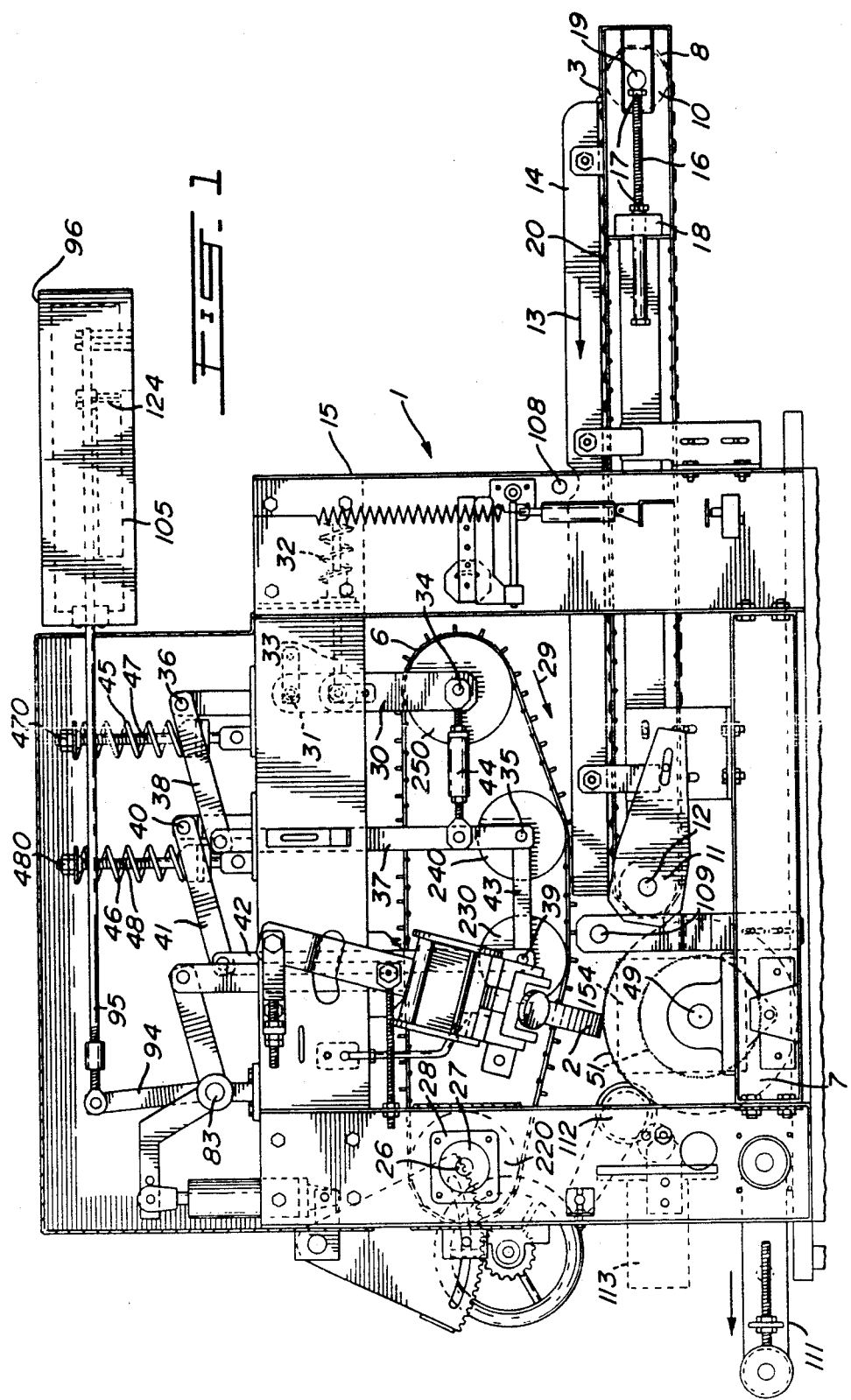
FIG. 1 is a side, elevation view of an apparatus in accordance with the invention for trimming the layer of back fat off a pork shoulder butt.

Referring now to FIGS. 1 and 2 of the attached drawings, the apparatus according to the invention, generally identified by the reference numeral 1, comprises a flat, flexible and arcuate cutting blade 2. In order to pass the shoulder butt through the blade 2, the apparatus 1 includes a conveyor 3, a set of three upper gripper belts 4, 5 and 6 mounted side by side, and a rotative roller 7.

The conveyor 3 is mounted on the frame 15 of the apparatus 1 and comprises three belts each formed of a series of transverse slats such as 8 made of stainless steel, pivotally attached to each other, and comprising meat engaging spikes such as 20. These three belts are mounted side by side onto two sets of three end rollers 10 and 11 rotatably mounted onto the frame 15. The rotative axle 12 on which are fixedly mounted the three rollers is driven by means of an hydraulic motor through an appropriate coupling (not shown), to thereby move the three belts of the conveyor 3 in the direction of the arrow 13. The hydraulic motor is supplied with a fluid (in particular hydraulic oil) under pressure by a source 103 (FIG. 5), for example a pump itself driven by an electric motor. The upper portions of the three belts between the rollers 10 and 11 of course slide onto a supporting surface (not shown). The three belts are tensioned on each side of the conveyor 3 by means of a threaded rod such as 16 receiving a pair of nuts such as 17 and mounted between a block 18 secured to the conveyor 3 and an axle 19 on which the rollers 10 are rotatably mounted. The conveyor 3 further comprises a pair of side rails such as 14. The structure of the conveyor 3 is otherwise conventional and accordingly will not be further elaborated.

The gripper belts 4, 5 and 6 are also each formed by a series of transverse slats such as 21 made of stainless steel, pivotally attached to each other and comprising meat engaging spikes such as 22. The belts 4, 5 and 6 are mounted side by side onto four sets of three rollers 220, 230, 240 and 250 rotatably mounted onto the frame 15. The rotative axle 26 on which the three rollers 220 are fixedly secured is rotated by means of an hydraulic motor 27 through an appropriate coupling 28, to thereby move the belts 4, 5 and 6 in the direction of the arrow 29 in FIG. 1. The motor 27 is also supplied with fluid under pressure by the above mentioned source 103. The center roller of the set 230 is of larger diameter as evidenced in FIG. 2 to adapt to the arcuation in the rotative roller 7.

The rollers 250 are mounted onto the frame 15 by means of a pair of generally vertical side arms such as 30 interconnecting with the frame 15 the ends of an axle 34 on which are rotatably mounted the rollers 250. The upper ends of the side arms 30 are attached to the frame 15 through respective pivots such as 31. A pair of side springs such as 32 pull the side arms 30 through respective rods such as 33 to thereby tension the belts 4, 5 and 6.

The two ends of the axle 35 on which the rollers 240 rotate are mounted on the frame 15 through respective side pivots such as 36 and respective pairs of pivotally interconnected side bars such as 37 and 38. In the same manner, the two ends of the axle 39 on which are rotatably mounted the rollers 230 are mounted on the frame 15 through respective side pivots such as 40 and respective pairs of pivotally interconnected side bars 41 and 42. The axles 35 and 39 on each side of the apparatus 1 are interconnected through a bar such as 43 pivotally attached to the corresponding ends of these axles, while the bars 30 and 37 are interconnected again on each side of the apparatus 1 through a turnbuckle 44 pivotally attached to the two latter bars.

Upon passage of the shoulder butt between the belts 4, 5 and 6 and the conveyor 3 and/or rotative roller 7, the sets of rollers 230 and 240 are forced upwardly whereby the bars 38 and 41 pivot on their respective pivots 36 and 40 against a force produced by a spring 45 associated to the bar 38 and by a spring 46 associated to the bar 41. As can be seen in FIG. 1, the springs 45 and 46 are respectively mounted on vertical support rods 47 and 48 threaded at their upper end and are pressed between the bars 38 and 41 and washer and nut assemblies 470 and 480, respectively. One can accordingly appreciate that the springs 45 and 46 produce a pressure on the butt as it passes between the belts 4-6 and the conveyor 3 and/or roller 7, which pressure can be adjusted by rotating the nuts of the assemblies 470 and 480, engaging the threaded rods 47 and 48, respectively. One can also appreciate that the belts 4-6 remain tensioned by means of the springs 32 pivoting the side arms 30 on their pivots 31. Of course pulling of the arm 30 by the spring 32 also causes pulling of the bars 37 and 42 through the bar 43 and the turnbuckle 44. Therefore, as the rollers 230 and 240 return to their initial position as shown in FIG. 1 during passage of the butt, they move downwardly but also in the direction of movement of the butt. Therefore, the belts 4-6 follow the shape of the butt as it passes through the apparatus while applying a pressure thereon.

The roller 7 is fixedly secured on a rotative axle 49. The latter roller is set into rotation by means of an hydraulic motor 113 mechanically connected to the axle 49 through a transmission 154. The hydraulic motor 113 is again supplied with fluid under pressure bY the source 103 shown in FIG. 5. The diameter of the rotative roller 7 reduces along the longitudinal axis of the latter from each end toward the center to define an annular and concave outer surface. The concave surface of the roller 7 is formed with meat engaging means under the form of rings such as 50 lying in planes perpendicular to the longitudinal axis of the roller 7, protruding from the annular and concave surface, and presenting teeths such as 51 distributed along their circumference. As can be seen, the roller 7 is positioned adjacent the blade 2, that is beneath the same, on the outside of the curve this arcuate blade defines.

The mechanism used to adjust the arcuation in the blade 2 and the distance separating this blade 2 from the concave and annular surface of the roller 7 will now be described in detail.

First of all, the apparatus 1 comprises to that effect two blade holders 52 and 53. Although the following description is made with reference to the holder 53, it should be remembered that the holder 52 has exactly the same structure as the holder 53 but is symmetric thereto with respect to a longitudinal, vertical and central plane.

The holder 53 is mounted on a metal bar 54 mounted on the frame 15 through a pivot 55 namely a bolt and nut assembly as illustrated in FIGS. 2 and 3. The pivot 55 is adjustable in position through a threaded rod 56 and a pair of nuts 57 engaged on the latter rod and disposed on either side of a flange 58 of the frame 15. The upper end of the bar 54 is connected to a U-shaped member 59 through a bolt and nut assembly 60. Attached to the base of the U-shaped member 59 is a threaded rod 61 inserted in a bore made through a L-shaped member 62 secured to the apparatus frame 15. By moving a pair of nuts 63 on the rod 61, the blade 2 can be moved as illustrated by the arrows 64 as the rod 61 slides in the bore of the member 62 and the bar 54 rotates about the pivot 55. Accordingly the position of the blade 2 with respect to the roller 7 can be adjusted as required by means of this mechanism. This enables orientation of the cutting edge of the blade 2 downwardly, thus preventing the blade 2 to tend to raise toward the lean meat.

A metal block 65 L-shaped in cross section is welded at the lower end of the metal bar 54. The holder 53 comprises two triangular and identical plates 66 and 67 united at an angle thereof through a pivot 70 rotating into one of a plurality of holes 110 bored into the block 65. The plates 66 and 67 can accordingly be pivoted with respect to the block 65 and bar 54.

The corresponding end of the blade 2 is fixedly attached to a grip device 68 of suitable structure, itself rotatably mounted on a pivot 69 interconnecting another angle of the triangular plates 66 and 67.

Accordingly, rotation of the holders 52 and 53 about their pivots 70 causes the blade 2 to change its arcuation as illustrated in dashed lines in FIG. 2. The distance between the blade 2 and the roller 7 also varies upon rotation of the holders as evidenced again in FIG. 2. More specifically, the latter distance in the center of the blade 2 varies by $\frac{1}{4}$ inch, that is the blade 2 is $\frac{1}{4}$ inch farther from the roller 7 in its position shown in full line compared to its position shown in dashed lines (without stabilizing rod 104 as will be seen hereinafter).

The apparatus can be equipped with a transversal stabilizing rod 104 (FIG. 2). This rod 104 has a threaded end inserted in a hole bored into a block 105 and fixed to this block by means of a pair of nuts 106 positioned on opposite sides of the block 105. The other end of the rod 104 slides into a hole bored in a second block 107. The blocks 105 and 107 are fixedly mounted onto the respective grip devices 68. Accordingly, during rotation of the blade holders 52 and 53 about their pivots 70, the transversal rod 104 slides into the hole of the block 107, while the relative angular position between the two grip devices 68, and therefore between the two ends of the blade 2 is maintained. It should be noted here that the position in the dotted lines of the blade 2 and grip devices 68 in FIG. 2 is that obtained with the apparatus 1 without rod 104 and blocks 105 and 107.

The mechanism provided in the apparatus 1 to pivot the holders 52 and 53 about their pivots 70 will now be described in detail.

The latter mechanism comprises a tubular element 73 mounted on a pivot 74 interconnecting the third angle of the triangular plates 66 and 67. Welded to the tubular element 73 are parallel, spaced apart flat fastener members 75. The lower end of a vertical arm 76 is pivotally mounted between the flat members 75 whereby the arm 76 causes no obstruction in the rotation of the bar 54 about the pivot 55.

An arm 82 is secured at one end to a transversal shaft 83 rotatably mounted onto the frame 15 of the apparatus 1. The other end of this arm 82 is connected to the upper end of the arm 76 through a pin 81. Arms 84 and 85, identical to the arms 82 and 76, respectively, are associated with the blade holder 52.

Another arm 77 is fixedly secured at one end to the shaft 83 and is fixed at the other end to the piston end of a double-action hydraulic cylinder 79 through a pin 80. Accordingly, operation of the cylinder 79, that is extension or retraction thereof, displaces the arm 77 to rotate the shaft 83 whereby the holders 52 and 53 are pivoted about their pivots 70 through the arms 82, 84 and 76, 85, respectively, to adjust as desired the position and arcuation of the blade 2.

The cylinder end of the hydraulic cylinder 79 is attached to the free end of an arm 86 through a pin 87, which arm 86 has its other end fixedly secured to a shaft 88 rotatable onto the frame 15. At one end thereof, the shaft 88 is fixedly secured to a triangular plate member 89 with a lower, arcuate teethed edge 90. The teeth of the edge 90 are meshed with those of a pinion 91 manually rotated through a wheel 92. Rotation of the wheel 92 and the pinion 91 in either direction 93 causes rotation of the shaft 88 through the plate member 89 and movement of the arm 86. The position of the cylinder 79 is therefore changed to accordingly modify spatially the range of positions of the blade 2 enabled through extension and retraction of this hydraulic cylinder 79. Indeed, any change in position of the cylinder 79 through pivoting of the shaft 88 also causes movement of the blade holders 52 and 53 through the arm 77, the shaft 83, and the arms 76, 82, 84 and 85. The wheel 92, pinion 91, plate member 89, and arm 86 are mainly used to adjust the shortest distance between the blade 2 and the roller 7 that can be obtained through operation of the cylinder 79 and pivoting of the holders 52 and 53 during the cutting operation.

As better illustrated in FIG. 1, the shaft 83 also bears a generally vertical arm 94 with a free end pivotally attached to a rod 95 adjustable in length and transmitting the movement of the shaft 83 to a linear encoder 96 schematically illustrated in FIG. 1. The encoder 96 therefore monitors the position of the shaft 83 and accordingly of the rotatable blade holders 52 and 53. More specifically, the encoder 96 comprises as shown in FIG. 1 an electrically conducting cursor 124 fixed to the free end of the rod 95 and sliding onto a series of transverse, successively conductive and non-conductive plaques 105, to produce electric pulses as the rod 95 and cursor 124 moves longitudinally.

Figure 5:
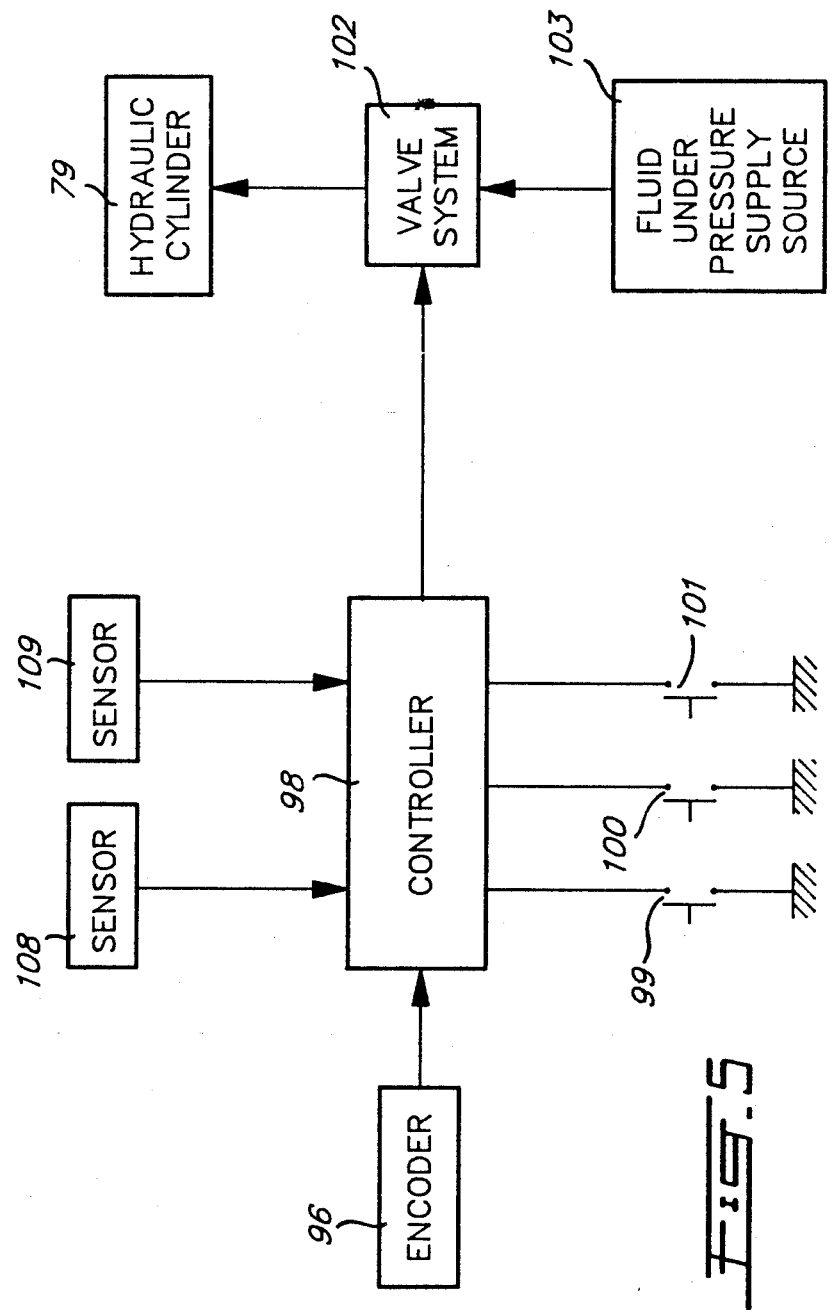
FIG. 5 is a block diagram of the system used for controlling and operating the mechanism of FIGS. 3 and 4.

As illustrated in FIG. 5, an electronic, programmable controller 98 receives the pulses from the encoder 96 as well as signals from two sensors 108 and 109 of the position of the pork shoulder butt in the apparatus 1 and from a series of three push buttons 99–101 all connected between the controller and the ground. Push button 99 is depressed when the layer of back fat is thick, push button 100 is depressed when the layer of fat is of medium thickness, and push button 101 is depressed if the layer of back fat is thin.

In response to the pulses from the encoder 96 to the signals from the sensors 108 and 109 and to depression of one of the push buttons 99, 100 or 101, the controller 98 operates a valve system 102 to supply the fluid under pressure from the supply source 103 to the double-action cylinder 79, to thereby extend or retract the cylinder 79 whereby the position and arcuation of the blade 2 can be changed as required. The sensors 108 and 109, controller 98, and valve system 102 can be constructed conventionally and are accordingly believed to be within the knowledge of one skilled in the art.

The following description details the operation of the trimming apparatus 1.

First of all, the operator depresses one of the push buttons 99, 100 or 101 in function of the thickness of the layer of back fat of the pork shoulder butt. If the fat layer is thick, the push button 99 is depressed. The push button 101 is depressed is the layer of fat is thin while the push button 100 is actuated when the fat layer is of medium thickness, as described hereinabove.

The pork shoulder butt is then disposed on the conveyor 3 (FIG. 1) with the layer of fat on the underside and conforming with the curvature in the blade 2, and with the thicker end of the butt on the front. The butt is also so disposed laterally on the conveyor 3 that the inner profile of the layer of fat, that is the profile of the fat and lean meat interface in the butt, aligns with the curvature in the blade 2.

As the butt passes the first sensor 108 (FIG. 5), the latter sensor transmits a signal to the controller 98. The sensor 108 consists of a pair of light emitter and receiver disposed on the opposite sides of the conveyor 3. It is mounted at the entry of the machine 1 as shown in FIG. 1. In response to the signal from the sensor 108 and the pulses from the encoder 96, the controller 98 is programmed to operate the valve system 102 to extend or retract the cylinder 79 so as to position the blade 2 in function of the push button 99, 100 or 101 depressed. For example, if the push button 99 has been depressed, the controller 98 operates the valve system 102 to retract the cylinder 79 and position the blade 2 as shown in full line in FIG. 2. When the push button 100 or 101 is depressed the blade 2 is placed in a position intermediate its full-line and dashed-line positions of FIG. 2. If the blade 2 is already in its position corresponding to the depressed push button, no extension or retraction of the cylinder 79 is required.

The second sensor 109 is identical to the sensor 108 and its position is shown in FIG. 1. When the shoulder butt passes the sensor 109, it transmits a signal to the controller 98 to start a fat trimming cycle. The controller 98 is programmed, in accordance with the shape of the pieces of meat and with the specifications of the client or user, to operate the cylinder 79 through the valve system 102 to thereby pivot the blade holders 52 and 53 so that the blade 2 is moved vertically to follow the variation in thickness of the layer of fat during cutting thereof by the blade 2, whereby trimming off of the layer of back fat is optimized. More specifically, at the beginning of the cutting operation, the thickness of the layer of back fat is not uniform; it is thicker on one side depending on the side of the animal from which the shoulder butt is coming. That is the reason why the curvature in the blade 2 does not follow exactly that in the roller 7. The butt, as mentioned above, can be so placed laterally on the conveyor 3 that the curve in the blade 2 conforms more closely to the profile of the fat and lean meat interface in the butt. As the layer of fat of the shoulder butt reduces in thickness and becomes uniform also in thickness, the blade 2 is moved toward the roller 7 and presents a curvature which conform more closely to that of the roller 7.

In the apparatus 1, the quality of the cut is mostly given by the combination of the blade 2 with the teethed roller 7. During the trimming operation, the shoulder butt is forced against the conveyor 3 and the roller 7 by the spring loaded belts 4, 5 and 6, adjustable in pressure and following the contour of the piece of meat. The roller 7 is arcuate to adequately shape the pork shoulder butt while it is teethed to grip the latter butt. More specifically, the arcuation in the roller 7 shapes the piece of meat to allow the blade to follow as closely as possible the inner profile of the layer of fat that is the interface between the lean meat and the fat. During cutting of the fat, the shoulder butt tends slightly but non-negligibly to resist to movement. Due to its concavity and relatively small diameter, the teeth of the roller suitably grip the butt to force it through the blade. The piece of meat also tends to turn on itself during the trimming operation. The teethed roller 7 minimizes such rotation.

It should also be pointed out that the teethed roller has been designed to work in combination with the mobile and flexible blade 2, advantageously made of tempered steel. To obtain an adequate trimming of the layer of fat, the flexible and mobile blade 2 should follow as closely as possible the interface between the meat and the fat. The arcuation in the roller 7 as well as the curvature in the blade 2 upon rotation of the blade holders 52 and 53 are designed for that purpose. Also the metal block 65 welded at the lower end of the bar 54 and the triangular plates 66 and 67 of the blade holders 52 and 53 comprise a plurality of holes such as 110 to receive the pivot 70 and accordingly to allow the user to change the curve in the blade 2 as the blade holders 52 and 53 rotate to thereby meet with the specifications of the client and/or to adapt the curve to the shape and dimensions of the pieces of meat.

During the fat trimming cycle, the blade 2 tends to laterally deviate, that is to follow in the shoulder butt the easier trajectory. The stabilizing rod 104 corrects this situation; it stabilizes the blade 2 as the latter moves vertically during the trimming operation.

Furthermore, as the conveyor 3, the belts 4-6 and the roller 7 are driven independently by means of separate hydraulic motors and couplings or transmissions, their speed can be somewhat different to control the angle of penetration of the blade 2 in the piece of meat. For example, the rotative speed of each hydraulic motor can be varied through adjustment of valves through which they are supplied with fluid under pressure. Obviously, this will cause the shoulder butt to raise or lower the nose.

A small, rotative and teethed roller 112 parallel to the roller 7 and mounted on the side thereof opposite to the conveyor 3 can be added to draw the butt as it passes through the blade 2 to thereby help in withdrawing the shoulder butt from the blade 2 while maintaining the alignment thereof to obtain a better cut. Again the roller 112 is driven by means of the hydraulic motor 113 through an appropriate gear system interconnecting the axles of the rollers 7 and 112.

The present invention aims to trim the layer of back fat off the pork shoulder butt as precisely as possible. For that purpose, control of the position and movement of the butt during the cutting operation is essential and is carried out adequately by the teethed, concave roller 7. Also, a highly flexible and mobile blade 2 is required to follow the inner profile and thickness, that is the dimensions and shape of the layer of back fat. The two above described elements, that is the roller 7 and the blade 2, perform adequately the above functions.

At the exit of the apparatus 1, a conveyor 111 evacuates (a) the lean meat after the same has been withdrawn from the blade 2 by the roller 112 and (b) the trimmed layer of back fat after the same has passed between the rollers 7 and 112. The structure of the conveyor 111 is conventional and is believed to be within the knowledge of one skilled in the art.

Although the present invention has been described hereinabove by way of a preferred embodiment thereof, this embodiment can be modified or will, within the scope of the appended claims, without departing from the spirit and nature of the subject invention.

What is claimed is:

1. An apparatus for trimming an outer layer of fat off a piece of meat, comprising:
   a frame;
   a flat, flexible and arcuate cutting blade with two ends;
   first and second blade holders pivotally mounted onto said frame, said first and second holders comprising means for securing thereto the two ends of the blade, respectively;
   means for passing the piece of meat through the blade to trim off the layer of fat, said passing means comprising a rotative roller with two opposite ends, with a center, with a longitudinal axis about which it rotates, and with a diameter gradually decreasing along its longitudinal axis from each end of said roller toward the center thereof to define an annular, concave outer surface, said rotative roller being mounted onto the frame adjacent the blade on the outside of the curve said arcuate blade defines but with a distance separating the said annular surface and the said blade to enable passage of the layer of fat between them, the annular outer surface of the roller comprising means for engaging the fat whereby rotation of said roller forces the piece of meat through the blade; and
   means for pivoting the first and second blade holders to adjust (a) the arcuation in the blade and (b) the distance separating the said annular concave surface and the said blade to an inner profile and a thickness of the layer of fat whereby trimming of said fat layer is optimized.

2. The trimming apparatus of claim 1, in which said first and second blade holders are each mounted onto the frame through a first pivot, and said means for securing the corresponding end of the blade to the holder comprises a second pivot spaced apart from the said first pivot.

3. The trimming apparatus of claim 2, wherein said arcuate blade is lying into a plane, and wherein said first and second pivots are generally perpendicular to said plane.

4. The trimming apparatus of claim 1, wherein said arcuate blade is lying into a plane, said trimming apparatus further comprising means for modifying an acute angle between the vertical and the plane in which the arcuate blade is lying.

5. The trimming apparatus of claim 1, in which said passing means comprises means for forcing the piece of meat against the rotative roller as it passes through the blade.

6. The trimming apparatus of claim 1, wherein said passing means comprises a conveyor for transporting the piece of meat toward said blade, said conveyor comprising one end at which said rotative roller is mounted, and wherein said passing means further comprises means for forcing said piece of meat against said conveyor and rotative roller.

7. The trimming apparatus of claim 6, in which the said means for forcing the piece of meat against the conveyor and rotative roller comprises at least one spring-tensioned continuously moving belt which follows the contour of the piece of meat as it passes through the blade.

8. The trimming apparatus of claim 7, comprising means for operating said conveyor, said spring-tensioned belt and said rotative roller at different speeds.

9. The trimming apparatus according to claim 1, wherein said blade holder pivoting means comprises means for pivoting simultaneously said first and second blade holders.

10. The trimming apparatus according to claim 2, in which said blade holder pivoting means comprises a system of articulated arms pivotally attached to said blade holders and to an hydraulic cylinder for pivoting said blade holders about their respective first pivots upon operation of the said hydraulic cylinder.

11. The trimming apparatus according to claim 10, in which said blade holder pivoting means further comprises:
   valve means for supplying said hydraulic cylinder with fluid under pressure;
   means for sensing the position of said system of articulated arms and for supplying a corresponding position representative signal; and
   controller means for operating said valve means in response to the position representative signal from the sensing means, to thereby operate said hydraulic cylinder and pivot said blade holders about their first pivots.

12. The trimming apparatus of claim 1, comprising means for adjusting a shortest distance between the blade and the annular, concave surface that can be obtained through pivoting of the first and second blade holders.

13. The trimming apparatus according to claim 10, in which said hydraulic cylinder has a piston end pivotally connected to the system of articulated arms, and a cylinder end mounted on the frame through a blade position adjusting member which displaces the said cylinder end to adjust a shortest distance between the blade and the annular concave surface that can be obtained through operation of said cylinder and pivoting of the first and second blade holders.

14. The trimming apparatus of claim 13, wherein said cylinder end is attached to the blade position adjusting member through a third pivot, and said blade position adjusting member is mounted on the frame through a fourth pivot spaced apart from said third pivot, said trimming apparatus further comprising means for pivoting the blade position adjusting member about said fourth pivot to thereby displace the cylinder end of the said hydraulic cylinder.

15. The trimming apparatus of claim 2, comprising means for displacing the said first pivots with respect to the frame.

16. The trimming apparatus of claim 1, wherein said fat engaging means of the rotative roller comprises a plurality of teethed rings formed onto said annular, concave surface, said teethed rings each lying into a respective plane perpendicular to said longitudinal axis of the roller.

17. The trimming apparatus of claim 1, further comprising a second rotative and teethed roller parallel and adjacent to the said roller with an annular concave surface, said second roller engaging the piece of meat to draw the same as it passes through the blade to thereby help in withdrawing the piece of meat from the said blade.

18. The trimming apparatus according to claim 17, in which said passing means comprises a conveyor for transporting the piece of meat toward the said blade and the said roller with an annular concave surface, the second roller being rotatably mounted adjacent the said roller with an annular concave surface on a side of the latter roller opposite to the conveyor.

19. The trimming apparatus of claim 1, in which the layer of fat is of varying inner profile and thickness, and in which said blade holder pivoting means comprises means for pivoting said first and second holders as the piece of meat passes through the blade to adjust (a) the arcuation in the blade and (b) the distance separating the said annular concave surface and the said blade to the varying inner profile and thickness of the layer of fat and thereby optimize trimming off thereof.

20. The trimming apparatus of claim 1, further comprising an horizontal stabilizing rod interconnecting the two ends of the flexible blade, said stabilizing rod having a first end fixedly attached to one end of the blade and a second end slidably attached to the other end of said blade.

* * * * *